US012649844B2

(12) United States Patent
Kim et al.

(10) Patent No.: US 12,649,844 B2
(45) Date of Patent: Jun. 9, 2026

(54) POLYMER COMPOSITION, MANUFACTURING METHOD OF CROSS-LINKABLE POLYMER AND CROSS-LINKABLE POLYMER

(71) Applicant: KOREA INSTITUTE OF SCIENCE AND TECHNOLOGY, Seoul (KR)

(72) Inventors: Tae Ann Kim, Seoul (KR); Jae Hong Kim, Seoul (KR); Seungjun Chung, Seoul (KR); Jeong Gon Son, Seoul (KR); Jong Hyuk Park, Seoul (KR); Sang-Soo Lee, Seoul (KR); Heesuk Kim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 583 days.

(21) Appl. No.: 18/136,986

(22) Filed: Apr. 20, 2023

(65) Prior Publication Data

US 2024/0199848 A1 Jun. 20, 2024

(30) Foreign Application Priority Data

Dec. 9, 2022 (KR) ........................ 10-2022-0171708

(51) Int. Cl.
*C08K 5/3415* (2006.01)
*C08F 220/68* (2006.01)
*C08J 3/24* (2006.01)

(52) U.S. Cl.
CPC .......... *C08K 5/3415* (2013.01); *C08F 220/68* (2013.01); *C08J 3/24* (2013.01); *C08J 2333/14* (2013.01)

(58) Field of Classification Search
CPC .................................................. C08F 220/281
See application file for complete search history.

(56) References Cited

U.S. PATENT DOCUMENTS

2021/0230781 A1* 7/2021 Ellison .................... D04H 3/16

FOREIGN PATENT DOCUMENTS

| | | |
|---|---|---|
| KR | 10-2018-0114725 | 10/2018 |
| KR | 10-2019-0096503 | 8/2019 |
| KR | 10-2020-0101303 | 8/2020 |
| KR | 10-2021-0036164 | 4/2021 |
| KR | 10-2302053 | 9/2021 |

OTHER PUBLICATIONS

Yoon, NPG Asia Materials (2022) 14:61, p. 1-11 and Supplementary Materials, p. S1-S22 (Year: 2022).*
Colaco, ACS Appl. Polym. Mater. 2020, 2, 2055-2062 (Year: 2020).*
Davis, Nature, vol. 459, May 2009, p. 68-72 (Year: 2009).*
Jiang, ACS Macro Lett. 2013, 2, 705-709 (Year: 2013).*
Kingsbury, J. Mater. Chem., 2011, 21, p. 8381-8388 (Year: 2011).*
(Continued)

*Primary Examiner* — Robert C Boyle
(74) *Attorney, Agent, or Firm* — LEX IP MEISTER, PLLC

(57) ABSTRACT

The present invention relates to a polymer composition including a linear polymer including a stress visualization molecule positioned at a center portion of a chain and including a furan group; and a cross-linking agent that is an amine having two or more maleimide functional groups, and a cross-linkable polymer formed therefrom.

21 Claims, 11 Drawing Sheets

(56) References Cited

OTHER PUBLICATIONS

Shengchao Jiang et al., "Mechanoresponsive PS-PnBA-PS Triblock Copolymers via Covalently Embedding Mechanophore", ACS Macro Lett., 2013, 2, 705-709, Jul. 24, 2013.
Ashley M. Hanlon et al., "Exploring structural effects in single-chain "folding" mediated by intramolecular thermal Diels-Alder chemistry", Polym. Chem., 2017, 8, 5120-5128, Mar. 27, 2017.
Shusheng Chen et al., "A Facile Strategy to Prepare Smart Coatings with Autonomous Self-Healing and Self-Reporting Functions," ACS Appl. Mater, Interfaces 2020, 12, 4, 4870-4877, https://dx.doi.org/10.1021/acsami.9b18919.
Xiaoke Song et al., "Intrinsic healable mechanochromic materials via incorporation of spiropyran mechanophore into polymer main chain," Polymer 250 (2022) 124878, https://doi.org/10.1016/j.polymer.2022.124878.
Douglas A. Davis et al.,"Force-induced activation of covalent bonds in mechanoresponsive polymeric materials," Nature vol. 459, May 7, 2009, doi:10.1038/nature07970.
Subin Yoon et al., "Mechanochromic and thermally reprocessable thermosets for autonomic damage reporting and self-healing coatings," NPG Asia Materials (2022) 14:61, https://doi.org/10.1038/s41427-022-00406-3.

* cited by examiner

POLYMER COMPOSITION, MANUFACTURING METHOD OF CROSS-LINKABLE POLYMER AND CROSS-LINKABLE POLYMER

CROSS-REFERENCE TO RELATED APPLICATION

This application claims priority to and the benefit of Korean Patent Application No. 10-2022-0171708 filed in the Korean Intellectual Property Office on Dec. 9, 2022, the entire contents of which are incorporated herein by reference.

BACKGROUND OF THE INVENTION

(a) Field of the Invention

The present invention relates to a polymer composition, a manufacturing method of a cross-linkable polymer, and a cross-linkable polymer, and more particularly, to a polymer composition for manufacturing a cross-linkable polymer capable of stress visualization and self-healing, a manufacturing method of a cross-linkable polymer, and a cross-linkable polymer.

(b) Description of the Related Art

Previously known self-damage reporting materials have been designed to insert heterogeneous materials in the form of capsules or channels into raw materials and show a color change when the capsules or the channels are damaged. Accordingly, these self-damage reporting materials have issues. Introducing the heterogeneous materials may lead to a decline in the physical properties of the raw materials. Moreover, it's impossible to reuse capsules and channels that have been damaged previously, making it impossible to implement a reporting function for recurrent damage.

In addition, self-healing materials in which healing materials are introduced in the form of capsules or channels face the same challenge as self-damage reporting materials in that they cannot self-heal against repeated damages. Another limitation of self-healing materials is that they require direct stimulation, such as heat or light, to heal damaged parts. However, identifying the precise location of the damaged area is often difficult, and specialized optical equipment or similar tools may be necessary for accurate detection of finely damaged area.

To develop coating materials that can effectively protect raw materials, it's essential to have a function that can show a visual change, making it possible to identify the damaged area promptly. Additionally, the damaged area should be self-healable through a simple and localized treatment, based on the identification described above.

The material capable of visualizing and self-healing the damaged portion as described above may be utilized as a coating material for a vehicle, an aircraft, a ship, or the like, and show the damaged portion and a damage degree as a visual signal to allow a danger to be immediately sensed and heal the damaged portion through a self-healing function or replace the damaged portion with another coating material. Accordingly, the raw materials may be protected in a more economical and efficient manner.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a polymer composition for manufacturing a cross-linkable polymer capable of stress visualization and self-healing, a manufacturing method of a cross-linkable polymer, and a cross-linkable polymer.

An exemplary embodiment of the present invention provides a polymer composition including a linear polymer including a stress visualization molecule positioned at a center portion of a chain and including a furan group; and a cross-linking agent that is an amine having two or more maleimide functional groups.

The linear polymer may be formed through an atom transfer radical polymerization (ARTP) reaction between the stress visualization molecule and a monomer containing a furan group.

The stress visualization molecule may be substituted with an alkyl halide.

The stress visualization molecule may be spiropyran, spirothiopyran, spiro rhodamine, naphthopyran, bis(adamantyl)dioxetane, or diarylbibenzofuranone substituted with an alkyl bromide.

The stress visualization molecule may be represented by Chemical Formula 1:

[Chemical Formula 1]

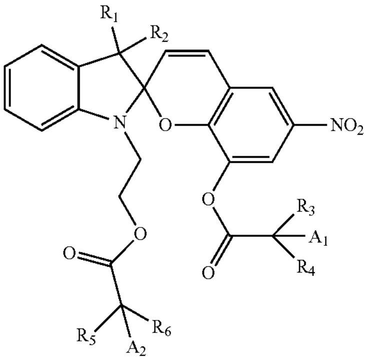

wherein $R_1$ to $R_6$ are each independently hydrogen or a substituted or unsubstituted $C_1$-$C_5$ alkyl group, and $A_1$ and $A_2$ are each independently any one of F, Cl, Br, and I.

The linear polymer may be represented by Chemical Formula 2:

[Chemical Formula 2]

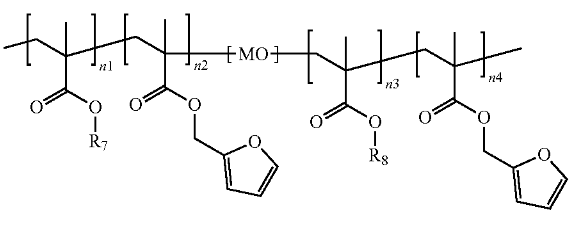

wherein $R_7$ and $R_8$ are each independently a substituted or unsubstituted $C_9$-$C_{15}$ alkyl group, n1 and n3 are each independently an integer of 20 to 160, n2 and n4 are each independently an integer from 1 to 50, and MO is the stress visualization molecule.

The cross-linking agent may be represented by Chemical Formula 3:

[Chemical Formula 3]

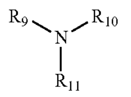

wherein $R_9$ to $R_{11}$ are each independently represented by hydrogen or Chemical Formula 4, where two or more of $R_9$ to $R_{11}$ are represented by Chemical Formula 4:

[Chemical Formula 4]

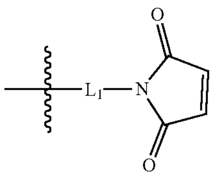

wherein $L_1$ is a direct bond or a substituted or unsubstituted $C_1$-$C_6$ alkylene group.

A molecular weight of the linear polymer may be 13,000 to 80,000 g/mol.

A ratio between the number of moles of the linear polymer and the number of moles of the cross-linking agent may be 5:1 to 1:1 (linear polymer:cross-linking agent).

Another exemplary embodiment of the present invention provides a manufacturing method of a cross-linkable polymer, including forming a mixture by mixing a linear polymer including a stress visualization molecule positioned at a central portion of a chain and including a furan group, a cross-linking agent that is an amine having two or more maleimide functional groups, and a solvent with each other; and forming the cross-linkable polymer by drying the mixture.

In the forming of the mixture, the mixing may be performed at a temperature of 20 to 30° C. for 15 minutes to 3 hours.

In the forming of the cross-linkable polymer, the drying may be performed at a temperature of 30 to 70° C. for 8 to 16 hours.

In the forming of the cross-linkable polymer, the drying may be performed in a vacuum atmosphere.

Yet another exemplary embodiment of the present invention provides a cross-linkable polymer formed by cross-linking a linear polymer including a stress visualization molecule positioned at a center portion of a chain and including a furan group and a cross-linking agent that is an amine having two or more maleimide functional groups with each other.

The cross-link may be formed by a Diels-Alder reaction between the furan group and the maleimide functional group.

The cross-linkable polymer may exhibit a purple color when stress of yield stress or more is applied to the cross-linkable polymer.

The cross-linkable polymer may exhibit a purple color when it is irradiated with ultraviolet rays (UV).

When the cross-linkable polymer is heated to a temperature of 100° C. or higher, the cross-linkable polymer may be cleaved by a retro Diels-Alder reaction.

The cross-linkable polymer may have peaks appearing at 700±10 $cm^{-1}$, 1700±10 $cm^{-1}$, 1070±10 $cm^{-1}$, and 1774±10 $cm^{-1}$ during Fourier transform infrared spectroscopy (FT-IR) spectrum analysis.

A glass transition temperature (Tg) of the cross-linkable polymer before the cross-link may be −45° C. or less.

The cross-linkable polymer according to an exemplary embodiment of the present invention is capable of stress visualization and self-healing. Accordingly, the cross-linkable polymer may be utilized as a coating material for a vehicle, an aircraft, a ship, or the like and show a damaged portion and a damage degree of the vehicle, the aircraft, the ship, or the like, as a visual signal to allow a danger to be immediately sensed, and heal the damaged portion through a self-healing function or replace the damaged portion with another coating material. Accordingly, raw materials may be protected in a more economical and efficient manner.

DETAILED DESCRIPTION OF THE EMBODIMENTS

The terms such as first, second, and third are used to describe various portions, components, regions, layers, and/ or sections, but various parts, components, regions, layers, and/or sections are not limited to these terms. These terms are only used to distinguish one part, component, region, layer, or section from another part, component, region, layer, or section. Accordingly, a first part, component, region, layer, or section described below may be referred to as a second part, component, region, layer, or section without departing from the scope of the present invention.

Terminologies as used herein are to mention only a specific exemplary embodiment, and are not to limit the present invention. Singular forms as used herein include plural forms as long as phrases do not clearly indicate an opposite meaning. The term "including" as used herein concretely indicates specific characteristics, regions, integer numbers, steps, operations, elements, and/or components, and is not to exclude the presence or addition of other characteristics, regions, integer numbers, steps, operations, elements, and components.

When any part is referred to as being "on" another part, any part may be directly on another part or the other portion may be interposed between any part and another part. In contrast, when any part is referred to as being "directly on" another part, the other part is not interposed between any part and another part.

All terms including technical terms and scientific terms as used herein have the same meaning as the meaning generally understood by a person of an ordinary skill in the art to which the present invention pertains unless defined otherwise. The terms defined in a generally used dictionary are additionally interpreted as having the meaning matched to the related art document and the currently disclosed contents and are not interpreted as ideal or very formal meaning unless defined.

In addition, unless otherwise specified, % refers to wt %, and 1 ppm is 0.0001 wt %.

The term "combination(s) thereof" described in an expression of a Markush type as used herein refers to one or more mixtures or combinations selected from the group consisting of components described in the expression of the Markush type, and means including any one or more selected from the group consisting of these components.

Hereinafter, an exemplary embodiment of the present invention will be described in detail so that a person of an ordinary skill in the art to which the present invention pertains may easily practice the present invention. As those skilled in the art would realize, the described embodiments may be modified in various different ways, all without departing from the spirit or scope of the present invention.

Figure 1:
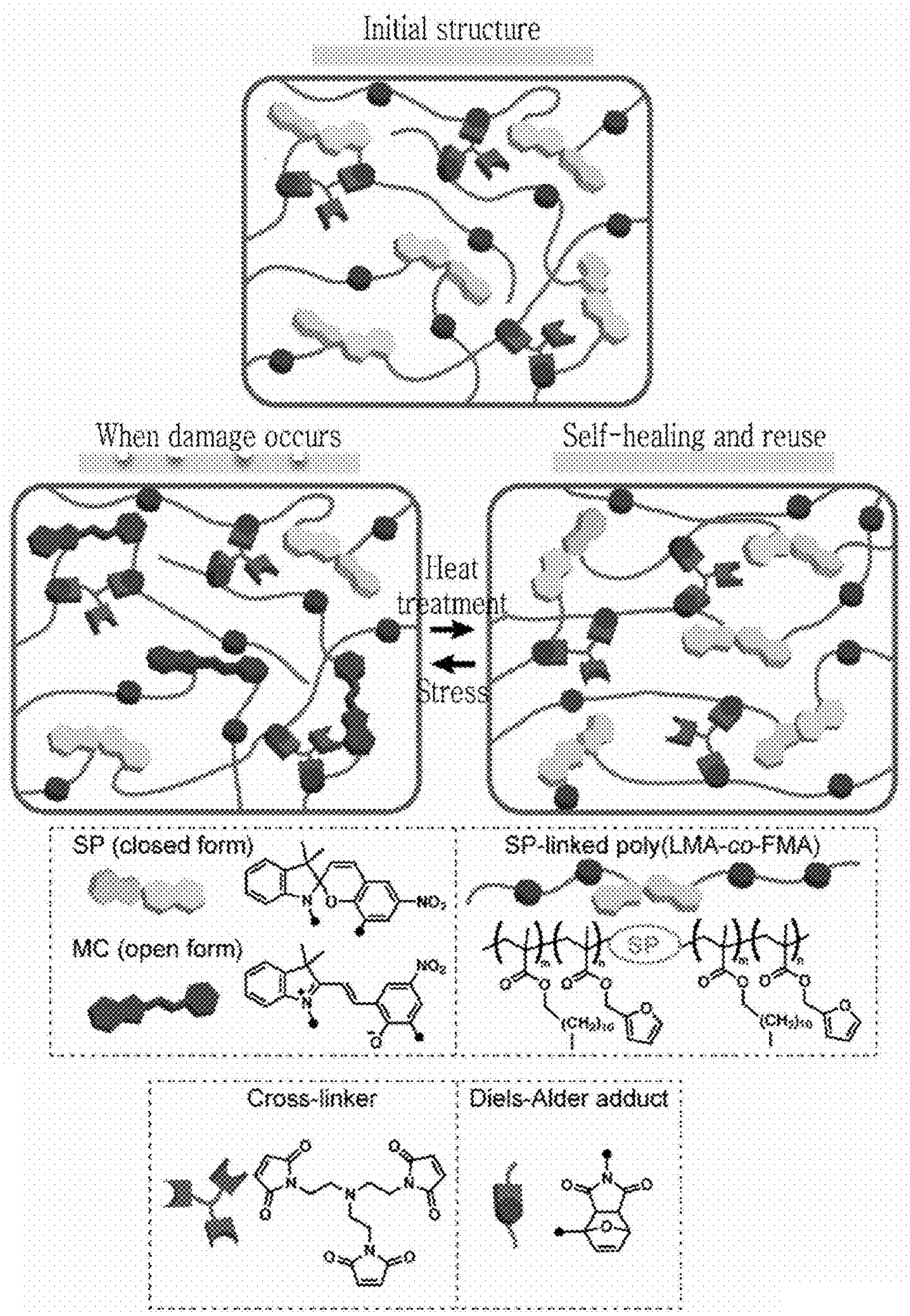
FIG. 1 is a conceptual diagram illustrating a stress visualization effect and a self-healing effect of a cross-linkable polymer according to the present invention.

FIG. 1 is a conceptual diagram illustrating a stress visualization effect and a self-healing effect of a cross-linkable polymer according to the present invention.

Referring to FIG. 1, a cross-linkable polymer according to the present invention may be formed by cross-linking a linear polymer and a cross-linking agent to each other.

In this case, when stress is applied to the cross-linkable polymer according to the present invention, a stress visualization molecule positioned at a central portion of a chain may change from a closed form to an open form to exhibit a color (purple) or fluorescence (red). Accordingly, the cross-linkable polymer has a stress visualization function.

In this case, the cross-link may be formed by a Diels-Alder reaction between the cross-linking agent and the linear polymer. In addition, this cross-link may be reversible. Accordingly, when the cross-linkable polymer is heated to a temperature of 100° C. or higher, the cross-linkable polymer may be cleaved by a retro Diels-Alder reaction. Accordingly, the cross-linkable polymer has a self-healing function.

Hereinafter, the cross-linkable polymer will be described in more detail.

1. Polymer Composition

First, an exemplary embodiment of the present invention provides a polymer composition.

The polymer composition may be a precursor of a cross-linkable polymer to be described later.

Specifically, an exemplary embodiment of the present invention provides a polymer composition including a linear polymer including a stress visualization molecule positioned at a center portion of a chain and including a furan group; and a cross-linking agent that is an amine having two or more maleimide functional groups.

First, the linear polymer will be described.

The linear polymer according to the present invention includes a stress visualization molecule positioned at a center portion of the chain and includes a furan group.

The linear polymer according to the present invention includes the stress visualization molecule at the central portion of the chain.

Referring to FIG. 1, the stress visualization molecule is converted from a closed form to an open form of merocyanine when stress is applied to the stress visualization molecule, and in this case, the stress visualization molecule may exhibit the color or the fluorescence. More specifically, the stress visualization molecule may exhibit a purple color or red fluorescence.

Preferably, the stress visualization molecule may be substituted with an alkyl halide. As the stress visualization molecule is substituted with the alkyl halide, the linear polymer may be more easily synthesized through an atom transfer radical polymerization (ARTP) reaction.

Specifically, the stress visualization molecule may be spiropyran, spirothiopyran, spiro rhodamine, naphthopyran, bis(adamantyl)dioxetane, or diarylbibenzofuranone substituted with an alkyl halide.

This stress visualization molecule may be more specifically represented by Chemical Formula 1:

[Chemical Formula 1]

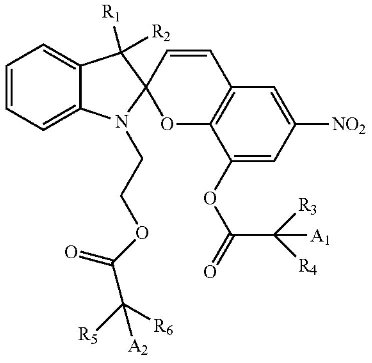

wherein $R_1$ to $R_6$ are each independently hydrogen or a substituted or unsubstituted $C_1$-$C_5$ alkyl group, and $A_1$ and $A_2$ are each independently any one of F, Cl, Br, and I.

More specifically, $R_1$ to $R_6$ may each independently be hydrogen or a substituted or unsubstituted $C_1$-$C_3$ alkyl group.

The term "substituted or unsubstituted" as used herein refers to being substituted or unsubstituted with one or more substituents selected from the group consisting of a halogen group; a nitrile group; a nitro group; a hydroxy group; a carbonyl group; an ester group; an imide group; an amino group; a phosphine oxide group; an alkoxy group; an aryloxy group; an alkyl thioxy group; an aryl thioxy group; an alkyl sulfoxy group; an aryl sulfoxy group; a silyl group; a boron group; an alkyl group; a cyclo-alkyl group; an alkenyl group; an aryl group; an aralkyl group; an aralkenyl group; an alkyl aryl group; an alkyl amine group; an aralkyl amine group; a heteroaryl amine group; an aryl amine group; an aryl phosphine group; or a heterocyclic group including one or more of N, O, and S atoms or being substituted or unsubstituted with a substituent in which two or more of these substituents are connected to each other For example, “a substituent in which two or more substituents are connected to each other” may be a biphenyl group. That is, the biphenyl group may be an aryl group, and may be interpreted as a substituent in which two phenyl groups are connected to each other.

Figure 2:
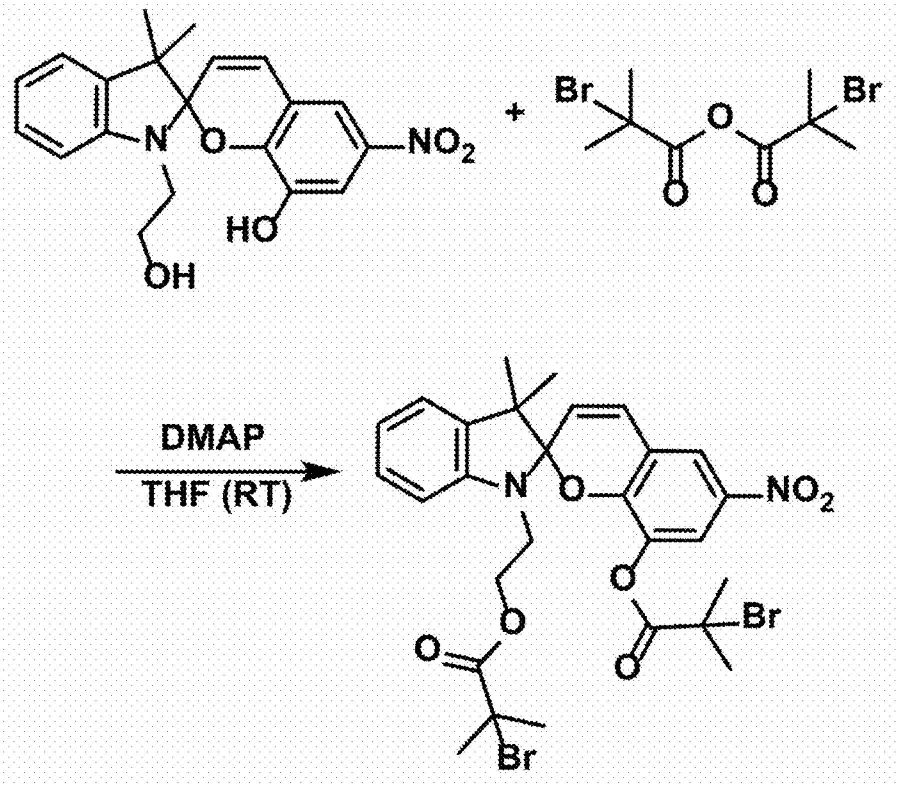
FIG. 2 is a view illustrating a method of synthesizing a stress visualization molecule according to the present invention.

FIG. 2 is a view illustrating a method of synthesizing a stress visualization molecule according to the present invention.

Referring to FIG. 2, the stress visualization molecule according to the present invention may be any one molecule selected from spiropyran, spirothiopyran, spirorhodamine, naphthopyran, bis(adamantyl)dioxetane, or diarylbibenzofuranone, which may be substituted with an alkyl bromide by esterification with 2-bromo-2-methylpropanic anhydride in the form of anhydride in the presence of a 4-dimethylaminopyridine (DMAP) catalyst, for example. However, the stress visualization molecule according to the present invention is not limited to a stress visualization molecule disclosed in FIG. 2.

The linear polymer according to the present invention includes a furan group.

More specifically, the linear polymer may be formed through an atom transfer radical polymerization (ARTP) reaction between the stress visualization molecule and a monomer containing a furan group.

The monomer is not particularly limited as long as it is capable of atom transfer radical polymerization. The monomer may be, for example, acrylate, styrene, acrylamide, acrylonitrile, or the like, or combinations thereof.

In this case, the monomer may contain a furan group. As the monomer contains the furan group, it may form a cross-linkable polymer by forming a cross-link through a Diels-Alder reaction with a cross-linking agent having a maleimide functional group, as described later.

Preferably, the monomer may include a first monomer of furfuryl methacrylate (FMA) containing a furan group and a second monomer of lauryl methacrylate (LMA).

This linear polymer may be represented by Chemical Formula 2:

[Chemical Formula 2]

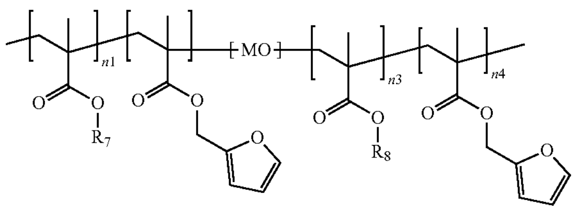

wherein $R_7$ and $R_8$ are each independently a substituted or unsubstituted $C_9$-$C_{15}$ alkyl group, n1 and n3 are each independently an integer of 20 to 160, n2 and n4 are each independently an integer from 1 to 50, and MO is the stress visualization molecule.

In this case, more specifically, $R_7$ and $R_8$ may each independently be a substituted or unsubstituted $C_{11}$-$C_{13}$ alkyl group.

In addition, in this case, more specifically, n1=n3 and n2=n4.

When n1 to n4 are within the above ranges, stress visualization and self-healing effects may be maximized. In particular, when n2 and n4 are within the above ranges, self-healing properties may be maximized by affecting cross-linkability.

Figure 3:
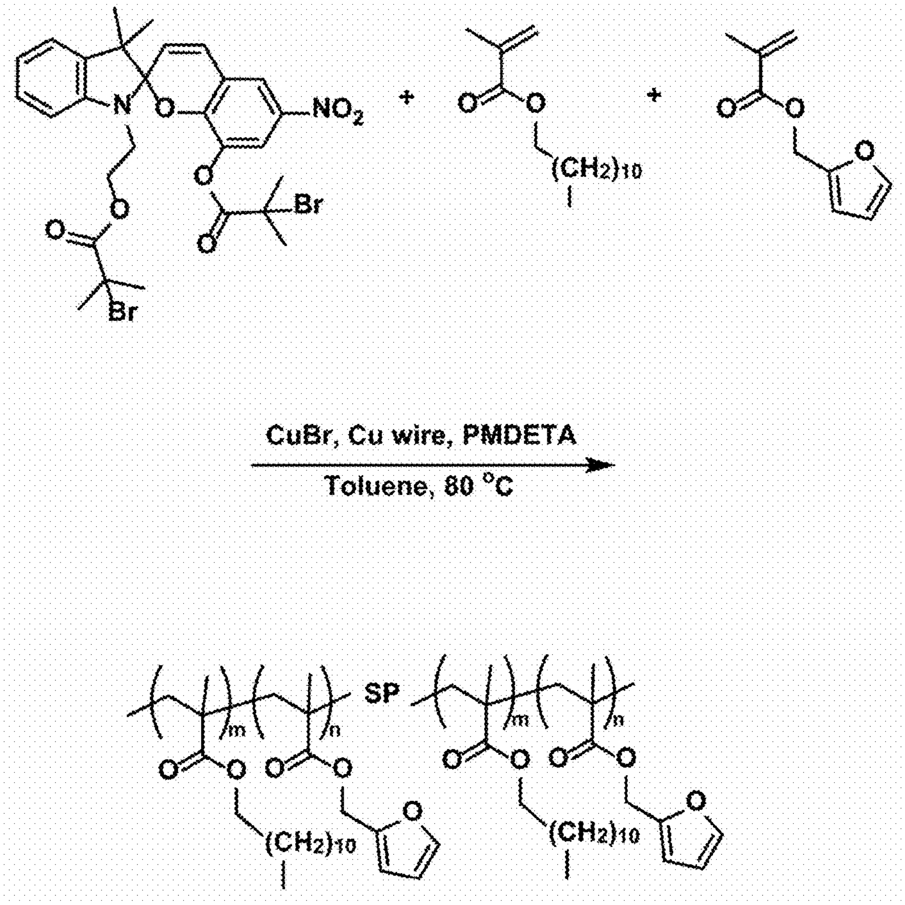
FIG. 3 is a view illustrating a method of synthesizing a linear polymer according to the present invention.

FIG. 3 is a view illustrating a method of synthesizing the linear polymer. However, the linear polymer is not limited to a polymer illustrated in FIG. 3.

Next, the cross-linking agent will be described.

The cross-linking agent according to the present invention is an amine having two or more maleimide functional groups.

Specifically, the cross-linking agent may be represented by Chemical Formula 3:

[Chemical Formula 3]

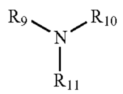

wherein $R_9$ to $R_{11}$ are each independently represented by hydrogen or Chemical Formula 4, where two or more of $R_9$ to $R_{11}$ are represented by Chemical Formula 4:

[Chemical Formula 4]

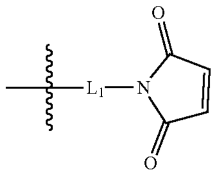

wherein $L_1$ is a direct bond or a substituted or unsubstituted $C_1$-$C_6$ alkylene group. More specifically, $L_1$ may be a substituted or unsubstituted $C_1$-$C_3$ alkylene group.

As the cross-linking agent has the maleimide functional group, it may form a cross-linkable polymer by forming a cross-link with the furan group included in the above-described linear polymer through a Diels-Alder reaction.

A molecular weight of the linear polymer may be 13,000 to 80,000 g/mol. When the molecular weight of the linear polymer is within the above range, a cross-linkable polymer to be described later may be more easily synthesized, and stress visualization and self-healing effects of the cross-linkable polymer may be further maximized.

A ratio between the number of moles of the linear polymer and the number of moles of the cross-linking agent may be 5:1 to 1:1 (linear polymer:cross-linking agent). When the ratio between the number of moles of the linear polymer and the number of moles of the cross-linking agent is within the above range, a cross-linkable polymer to be described later may be more easily synthesized, and stress visualization and self-healing effects of the cross-linkable polymer may be further maximized.

2. Manufacturing Method of Cross-Linkable Polymer

Another exemplary embodiment of the present invention provides a manufacturing method of a cross-linkable polymer, including forming a mixture by mixing a linear polymer including a stress visualization molecule positioned at a central portion of a chain and including a furan group, a cross-linking agent that is an amine having two or more maleimide functional groups, and a solvent with each other; and forming the cross-linkable polymer by drying the mixture.

Hereinafter, each step of a manufacturing method of a cross-linkable polymer according to another exemplary embodiment of the present invention will be described.

First, a mixture is formed by mixing a linear polymer including a stress visualization molecule positioned at a central portion of a chain and including a furan group, a cross-linking agent that is an amine having two or more maleimide functional groups, and a solvent with each other.

In this case, the linear polymer and the cross-linking agent are as described above.

The solvent is not particularly limited as long as it may dissolve the linear polymer and the cross-linking agent. More specifically, the solvent may be an organic solvent, for example, chloroform, but is not limited thereto.

In this case, the mixing may be performed at a temperature of 20 to 30° C. for 15 minutes to 3 hours. When the mixing temperature and mixing time are in the above ranges, the cross-linkable polymer may be more easily synthesized, and stress visualization and self-healing effects of the cross-linkable polymer may be further maximized.

More specifically, when the mixing temperature is excessively low, a problem may occur because the linear polymer and the cross-linking agent are not completely dissolved, and when the mixing temperature is excessively high, a problem that a reaction is non-uniformly performed may occur.

In addition, when the mixing time is excessively short, a problem that a non-uniform cross-link structure is formed may occur, and when the mixing time is excessively long, a problem that a cross-link structure in a solution phase is formed may occur.

Next, a cross-linkable polymer is formed by drying the mixture.

In this case, the drying may be performed at a temperature of 30 to 70° C. for 8 to 16 hours. When the drying temperature is excessively low, a problem that it takes a lot of time to form a film may occur, and when the drying temperature is excessively high, a problem that a cross-link polymer having a non-uniform shape is formed may occur. In addition, when the drying time is excessively short, a problem may occur due to a residual solvent, and when the drying time is excessively long, it may be inefficient when considering an effect according to process cost and time.

In addition, the drying may be performed in a vacuum atmosphere.

3. Cross-Linkable Polymer

Yet another exemplary embodiment of the present invention provides a cross-linkable polymer formed by cross-linking a linear polymer including a stress visualization molecule positioned at a center portion of a chain and including a furan group and a cross-linking agent that is an amine having two or more maleimide functional groups with each other.

The cross-link may be formed by a Diels-Alder reaction between the furan group included in the linear polymer and the maleimide functional group included in the cross-linking agent.

In this case, the stress visualization molecule, the furan group, and the cross-link included in the cross-linkable polymer have been described above, and a description thereof will thus be omitted.

The cross-linkable polymer may exhibit a purple color when stress of yield stress or more is applied to the cross-linkable polymer. Alternatively, the cross-linkable polymer may exhibit a purple color when it is irradiated with ultraviolet rays (UV).

The cross-linkable polymer may exhibit red fluorescence when stress of yield stress or more is applied to the cross-linkable polymer.

This is due to the stress visualization molecule included in the cross-linkable polymer, and the stress visualization molecule has been described above, and a detailed description thereof will thus be omitted.

In particular, the cross-link may be reversible.

More specifically, when the cross-linkable polymer is heated to a temperature of 100° C. more, the cross-linkable polymer may be cleaved by a retro Diels-Alder reaction. Accordingly, when the cross-linkable polymer is heated to the temperature of 100° C. more, a physically damaged portion may be self-healed by the decomposition of the cross-link by the retro Diels-Alder reaction.

The cross-linkable polymer may have peaks appearing at 700±10 $cm^{-1}$, 1700±10 $cm^{-1}$, 1070±10 $cm^{-1}$, and 1774±10 $cm^{-1}$ during Fourier transform infrared spectroscopy (FT-IR) spectrum analysis. This is detection results of a C—H bond (700±10 $cm^{-1}$) of a C═C bond present in a cross-linked portion by the Diels-Alder reaction, a C═O carbonyl group (1700±10 $cm^{-1}$) present in a maleimide ring, C—O—C ether stretching (1070±10 $cm^{-1}$), and C═C double bond stretching (1774±10 $cm^{-1}$).

A glass transition temperature (Tg) of the cross-linkable polymer before the cross-link may be −45° C. or less. As the glass transition temperature is sufficiently low as in the above range, there is an advantage that a self-healing rate is remarkably fast.

The cross-linkable polymer according to yet another embodiment of the present invention may be utilized as a coating material for a vehicle, an aircraft, a ship, or the like. Accordingly, the cross-linkable polymer may show a damaged portion and a damage degree of the vehicle, the aircraft, the ship, or the like, as a visual signal to allow a danger to be immediately sensed and heal the damaged portion through a self-healing function through heat treatment or replace the damaged portion with another coating material. Accordingly, the raw materials may be protected in a more economical and efficient manner.

Hereinafter, exemplary embodiments of the present invention will be described in more detail through examples. However, the following examples are only preferred examples of the present invention, and the present invention is not limited by the following examples.

Example 1

(1) Manufacturing of Stress Visualization Molecule

Spiropyran (1.00 g, 2.73 mmol, 1 equiv) and 4-dimethylaminopyridine (599 mg, 1.38 mmol, 1.8 equiv) were dissolved in THF (22 ml). A solution of THF (29 ml) in which 2-Bromo-2-methylpropanic anhydride (2.22 mg, 7.08 mmol, 2.6 equiv) was dissolved dropped to a solution in which spiropyran was dissolved drop by drop, and stirred for about half a day. The solvent was completely removed, purification was performed through a column chromatography process, and a stress visualization molecule was then obtained in a yellow crystal form through recrystallization in hexane (1.63 g, 2.46 mmol, 90%). FIG. 2 illustrates a synthesis process of such a stress visualization molecule and the stress visualization molecule manufactured by the synthesis process.

(2) Manufacturing of Linear Polymer

Lauryl methacrylate (LMA) (2.8 ml, 9.6 mmol, 320 equiv), furfuryl methacrylate (FMA) (0.29 ml, 1.9 mmol, 64 equiv), the stress visualization molecule (20 mg, 0.03 mmol, 1 equiv) manufactured as described above, CuBr (4.3 mg, 0.03 mmol, 1 equiv), and a copper wire (3 cm) were accurately weigh-measured and put into a 50 ml shrink flask.

A vacuum and Ar purging process was performed several times, and toluene (9.3 ml) and PMDETA (6.3 μl, 0.03 mmol, 1 equiv) were then put into the flask. In order to remove oxygen, a freeze-pump-thaw process was performed three times, and a reaction was initiated at a temperature of 80° C. in an Ar environment. In order to complete the reaction, a stopper of the flask was removed to bring the resulting solution into contact with air and lower viscosity of the resulting solution with THF. A polymer solution was passed through a column filled with basic alumina to remove a metal catalyst and precipitate and remove an unreacted material in methanol. A precipitated solid material was obtained and vacuum-dried to obtain a linear polymer having a stress visualization molecule introduced at the center thereof. FIG. 3 illustrates a synthesis process of such a linear polymer and a linear polymer manufactured by the synthesis process.

(3) Manufacturing of Cross-Linkable Polymer

Figure 4:
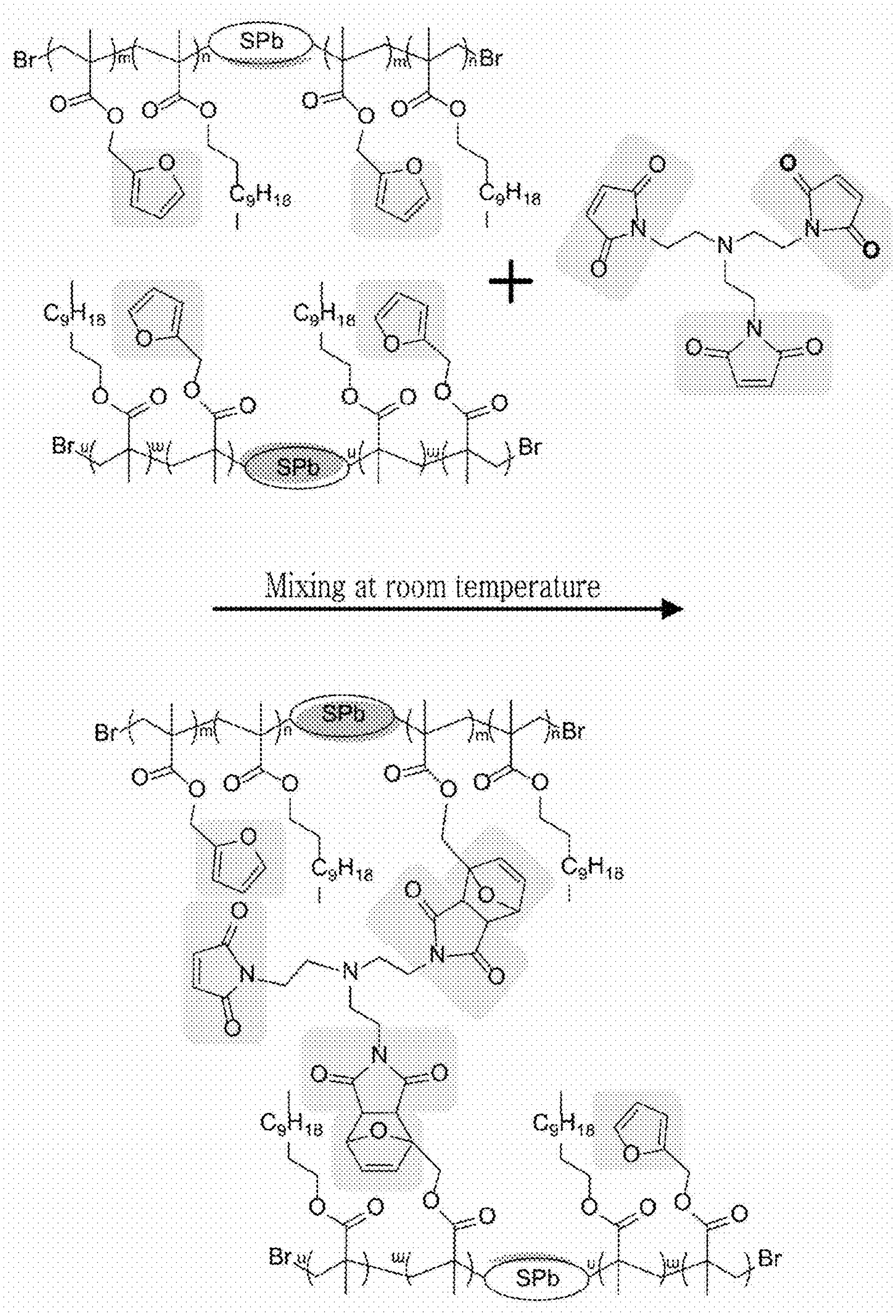
FIG. 4 is a view illustrating a method of synthesizing a cross-linkable polymer according to the present invention.

The manufactured linear polymer (0.5 g, 0.037 mmol, mole of furan in the polymer=0.056 mmol) and tris(2-maleimidoethyl)amine (7.3 mg, 0.019 mmol, mole of maleimide in the cross-linkers=0.056 mmol) were dissolved in chloroform (10 wt %) and stirred for 1 hour. The well-mixed solution was poured into a Teflon dish and dried in a vacuum oven of 50° C. for 12 hours to obtain a cross-linkable polymer. The cross-linkable polymer may be obtained in the form of a film by compression molding at 140° C. for 30 minutes. FIG. 4 illustrates a synthesis process of such a cross-linkable polymer and a cross-linkable polymer manufactured by the synthesis process.

Example 2

A stress visualization molecule, a linear polymer, and a cross-linkable polymer were manufactured in the same manner as in Example 1, except that a molar ratio between FMA and LMA was adjusted to 15:1 during the synthesis of the linear polymer.

Example 3

A stress visualization molecule, a linear polymer, and a cross-linkable polymer were manufactured in the same manner as in Example 1, except that a molar ratio between FMA and LMA was adjusted to 5:1 during the synthesis of the linear polymer.

Example 4

A stress visualization molecule, a linear polymer, and a cross-linkable polymer were manufactured in the same manner as in Example 1, except that a concentration of the stress visualization molecule was adjusted to $5.6\times10^{-3}$ M and a molar ratio between FMA and LMA was adjusted to 30:1 during the synthesis of the linear polymer.

Example 5

A stress visualization molecule, a linear polymer, and a cross-linkable polymer were manufactured in the same manner as in Example 1, except that a concentration of the stress visualization molecule was adjusted to $5.6\times10^{-3}$ M and a molar ratio between FMA and LMA was adjusted to 15:1 during the synthesis of the linear polymer.

Example 6

A stress visualization molecule, a linear polymer, and a cross-linkable polymer were manufactured in the same manner as in Example 1, except that a concentration of the stress visualization molecule was adjusted to $5.6\times10^{-3}$ M and a molar ratio between FMA and LMA was adjusted to 5:1 during the synthesis of the linear polymer.

Example 7

A stress visualization molecule, a linear polymer, and a cross-linkable polymer were manufactured in the same manner as in Example 1, except that a concentration of the stress visualization molecule was adjusted to $2.3\times10^{-3}$ M and a molar ratio between FMA and LMA was adjusted to 30:1 during the synthesis of the linear polymer.

Example 8

A stress visualization molecule, a linear polymer, and a cross-linkable polymer were manufactured in the same manner as in Example 1, except that a concentration of the stress visualization molecule was adjusted to $2.3\times10^{-3}$ M and a molar ratio between FMA and LMA was adjusted to 15:1 during the synthesis of the linear polymer.

Example 9

A stress visualization molecule, a linear polymer, and a cross-linkable polymer were manufactured in the same manner as in Example 1, except that a concentration of the stress visualization molecule was adjusted to $2.3\times10^{-3}$ M and a molar ratio between FMA and LMA was adjusted to 5:1 during the synthesis of the linear polymer.

Experimental Example 1: FT-IR Spectrum Analysis

Figure 5:
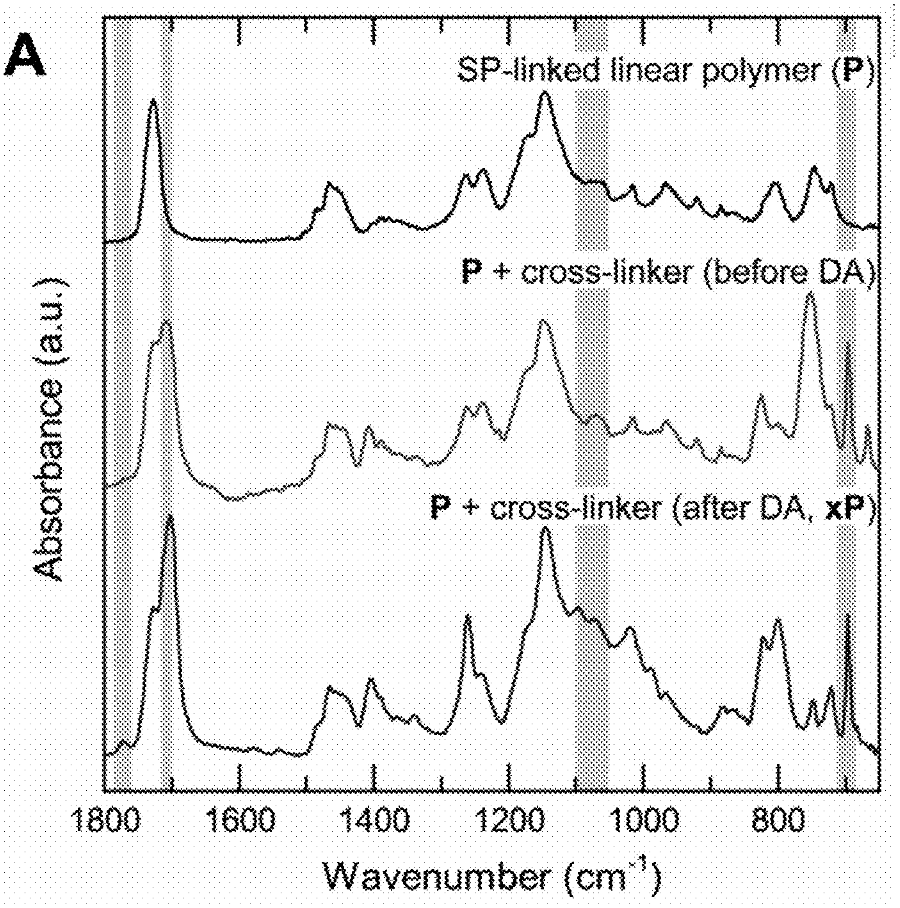
FIG. 5 is a graph of a result of a spectrum analysis test using a Fourier Transform Infrared Spectroscopy (FT-IR) for the cross-linkable polymer prepared in Example 1.

A spectrum analysis experiment using a Fourier transform infrared spectroscopy (FT-IR) was performed on the cross-linkable polymer manufactured according to Example 1, and experiment results were illustrated in FIG. 5.

Referring to FIG. 5, in the case of the cross-linkable polymer in which a Diels-Alder reaction was completed, it could be confirmed that peaks appeared at 700±10 $cm^{-1}$, 1700±10 $cm^{-1}$, 1070±10 $cm^{-1}$, and 1774±10 $cm^{-1}$.

This may be interpreted as detection results of a C—H bond (700±10 $cm^{-1}$) of a C═C bond present in a cross-linked portion by the Diels-Alder reaction, a C═O carbonyl group (1700±10 $cm^{-1}$) present in a maleimide ring, C—O—C ether stretching (1070±10 $cm^{-1}$), and C═C double bond stretching (1774±10 $cm^{-1}$).

Experimental Example 2: Differential Scanning Calorimetry (DSS) Evaluation

A cross-link reversibility evaluation experiment was performed on the cross-linkable polymer manufactured according to Example 1. Specifically, when a temperature of 100° C. or higher was applied to the cross-linkable polymer, an endothermic peak was analyzed through differential scanning calorimetry (DSC), and analysis results were illustrated in FIG. 6.

Figure 6:
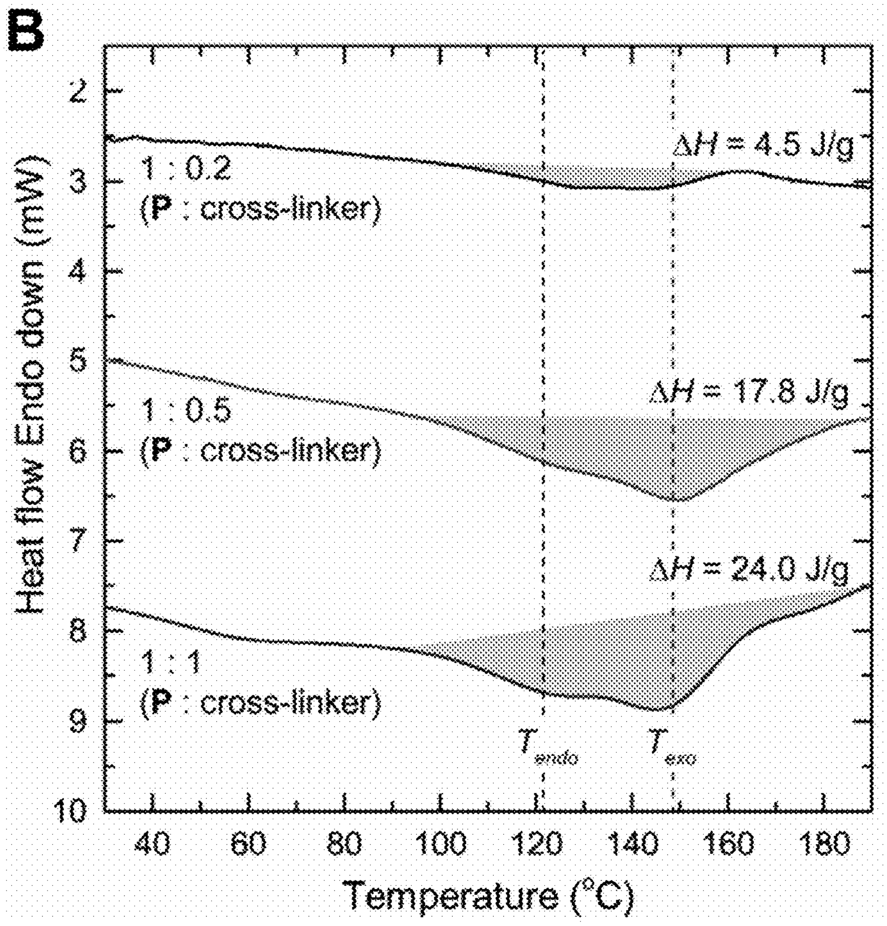
FIG. 6 is a graph showing a result of cross-linking reversibility evaluation experiments for the cross-linkable polymer prepared in Example 1.

Referring to FIG. 6, it could be confirmed that when the temperature of 100° C. or higher was applied to the cross-linkable polymer, a retro Diels-Alder reaction occurred and an endothermic peak appeared. In this case, it could be confirmed that an endothermic peak area gradually increased until a molar ratio between a maleimide functional group included in a cross-linking agent and a furan group included in a linear polymer reached 1:1, and it could be confirmed that an endothermic peak area was no longer increased occurred when a more amount of cross-linking agent was introduced.

Accordingly, it could be confirmed that an endothermic reaction occurred as a cross-link between the maleimide functional group and the furan group by the Diels-Alder reaction was cleaved at a temperature of 100° C. or higher.

Experimental Example 3: Evaluation of Stress Visualization Effect and Self-Healing Effect A stress visualization effect evaluation experiment of the cross-linkable polymer manufactured according to Example 1 was performed, and experiment results were illustrated in FIGS. 7 and 8.

Figure 7:
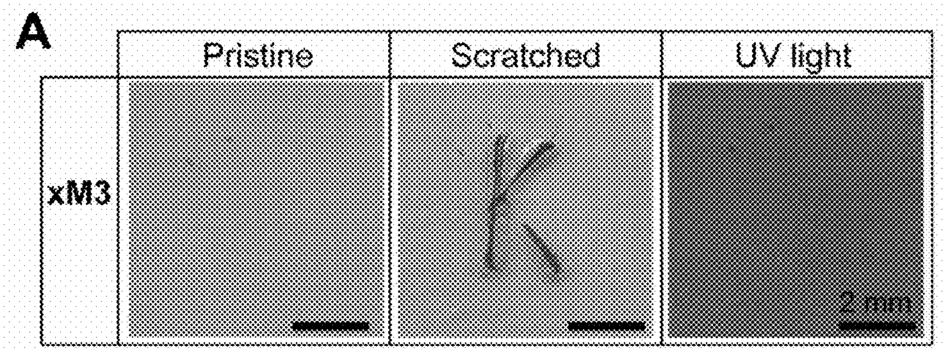
FIG. 7 and FIG. 8 are graphs of test results for evaluating the stress visualization effect of the cross-linkable polymer prepared in Example 1.

Specifically, a surface coated with the cross-linkable polymer was scratched with tweezers and image-captured when it is irradiated with ultraviolet rays, and image-capturing results were illustrated in FIG. 7. In this case, when the surface coated with the cross-linkable polymer is scratched with the tweezers, stress of yield stress or more of the cross-linkable polymer was applied to the cross-linkable polymer.

Referring to FIG. 7, it could be confirmed that a color of a scratched portion is changed into a purple color when the surface coated with the cross-linkable polymer is scratched with the tweezers.

Figure 8:
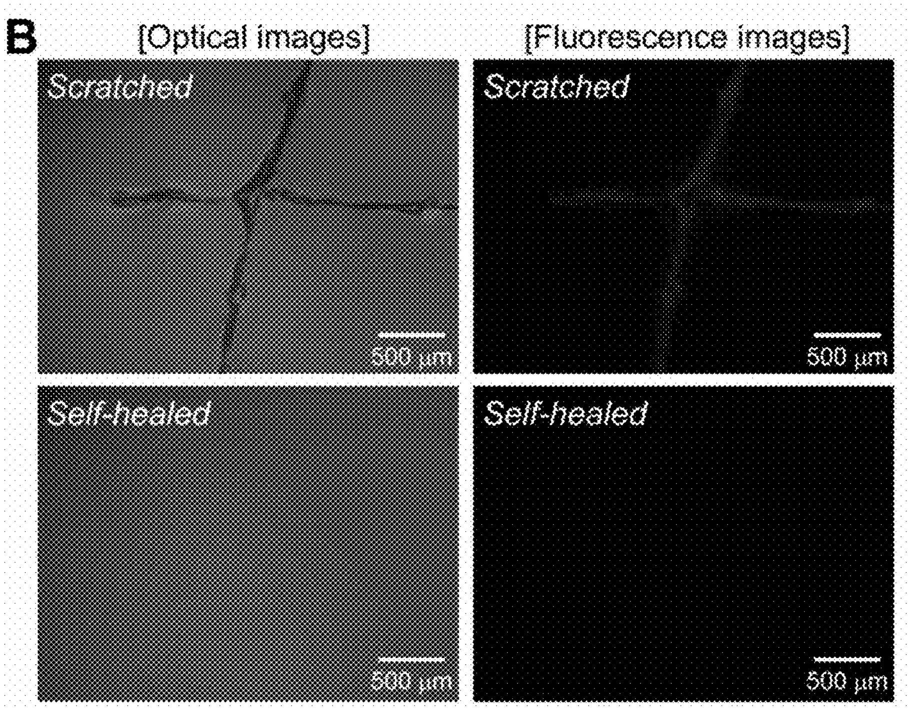

In addition, the surface coated with the cross-linkable polymer was scratched with the tweezers, heat-treated at 100° C. or higher, and image-captured in a dark room. Image-capturing results were illustrated in FIG. 8. Referring to FIG. 8, it could be confirmed that a portion scratched with the tweezers exhibited red fluorescence, and then self-healed by heat treatment at 100° C. or higher and the fluorescence disappeared.

Experimental Example 4: Evaluation of Cross-Link Reversibility

A cross-link reversibility evaluation experiment was performed on the cross-linkable polymer manufactured according to Example 1. Specifically, at 25° C., the manufactured cross-linkable polymer was put into a beaker in which a toluene solvent is accommodated. Thereafter, a temperature was raised to 130° C., and the cross-linkable polymer was then left for 3 hours. Thereafter, a temperature was lowered to 50° C. again, and the cross-linkable polymer was then left for 12 hours. Thereafter, a temperature was raised to 130° C. again, and the cross-linkable polymer was then left for 3 hours. Images of such series of processes were captured, and image-capturing results were illustrated in FIG. 9.

Figure 9:
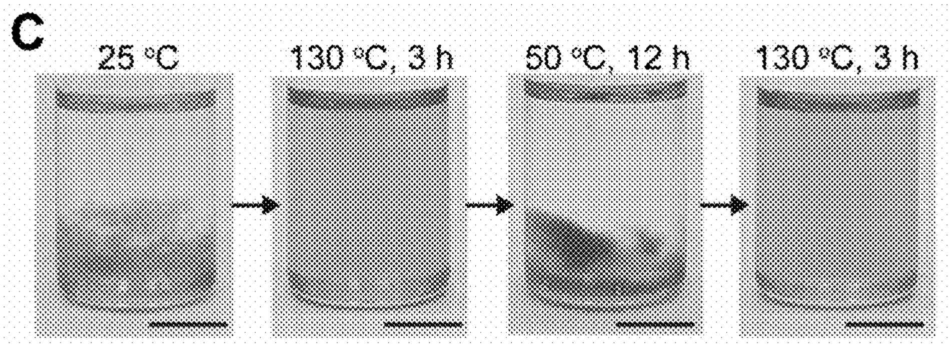
FIG. 9 is a photograph of a result of an experiment for evaluating the reversibility of cross-linking of the cross-linkable polymer prepared in Example 1.

Referring to FIG. 9, it could be confirmed that the cross-linkable polymer had low solubility in the toluene solvent to be precipitated at 25° C.

Thereafter, when the temperature was raised to 130° C., it could be confirmed that a cross-link was cleaved by a retro Diels-Alder reaction, such that the cross-linkable polymer was separated into a linear polymer and a cross-linking agent, which were dissolved in the solvent again.

Thereafter, when the temperature is lowered to 50° C. again, it could be confirmed that a cross-link was formed by a Diels-Alder reaction to form the cross-linkable polymer, which was precipitated.

Thereafter, when the temperature was raised to 130° C. again, it could be confirmed that a cross-link was cleaved by a retro Diels-Alder reaction again, such that the cross-linkable polymer are separated into a linear polymer and a cross-linking agent, which were dissolved in the solvent again.

Through such series of processes, it could be confirmed that the cross-link could continue to be reversibly formed in the cross-linkable polymer according to the present Example in accordance with an increase or a decrease in the temperature.

Experimental Example 5: Evaluation of Coating Product Stress Visualization Effect A stress visualization effect evaluation experiment when the cross-linkable polymer manufactured according to Example 1 was utilized as a coating product was performed, and experiment results were illustrated in FIG. 10.

Specifically, the manufactured cross-linkable polymer was coated in the form of a film on glass, steel, and wooden substrates by a compression molding method at 140° C. for 30 minutes. Thereafter, the glass, steel, and wooden substrates were scratched by tweezers at room temperature and heated to a temperature of 100° C. or higher. Image capturing was performed, and image capturing results were illustrated in FIG. 10.

Figure 10:
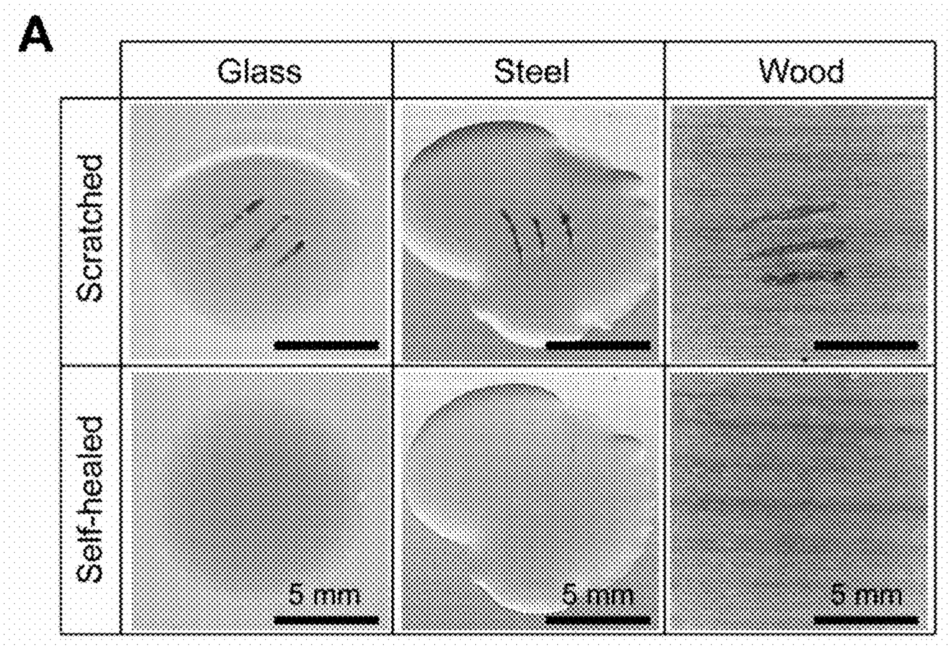
FIG. 10 is a photograph of a result of the stress visualization effect evaluation test when used as a coating product of a cross-linkable polymer prepared according to Example 1

Referring to FIG. 10, it could be confirmed that a stress visualization effect and a self-healing effect were well implemented in all cases of coating the cross-linkable polymer on the glass, steel, and wooden substrates.

Experimental Example 6: Dynamic Mechanical Analysis (DMA) Evaluation

Figure 11:
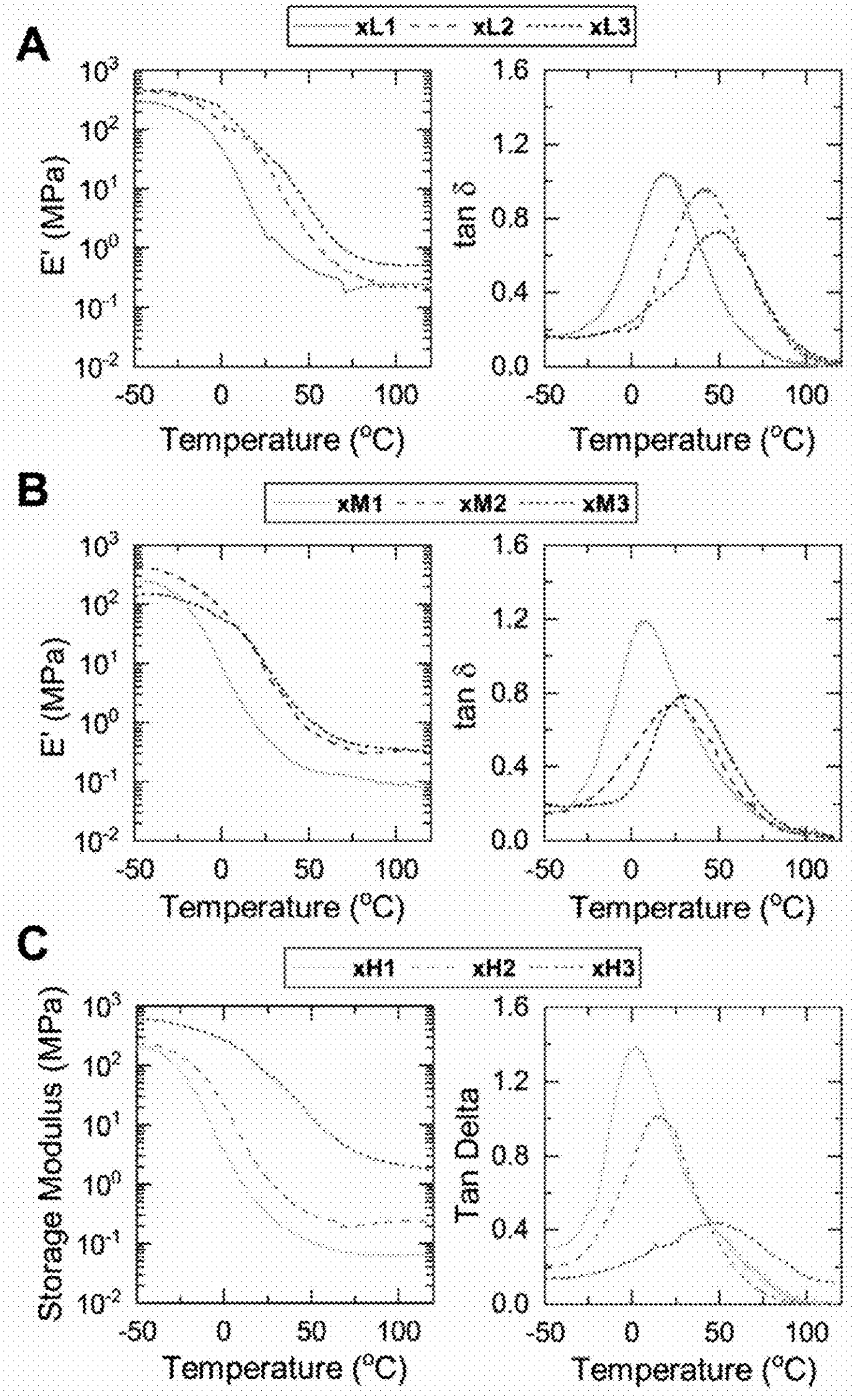
FIG. 11 is a graph of a measurement result of a storage modulus (E') and a loss tangent value of the cross-linkable polymers prepared in Examples 1 to 9 through dynamic mechanical analysis (DMA).

Storage moduli (E') and loss tangent values of the cross-linkable polymers manufactured according to Examples 1 to 9 were measured through dynamic mechanical analysis (DMA), and measurement results were illustrated in FIG. 11.

Referring to FIG. 11, it could be confirmed that as a molar ratio of furfuryl methacrylate (FMA) increased (1→3), E' values were increased and heights of the loss tangent values were decreased. This seems to be because as a molar ratio of FMA increases, more cross-links might be formed, such that elastic moduli of materials were increased.

It could be confirmed that E' values and loss tangent values according to a molecular weight did not show special tendency at the same FAM content.

Experimental Example 7: Stress-Strain Curve Evaluation

Figure 12:
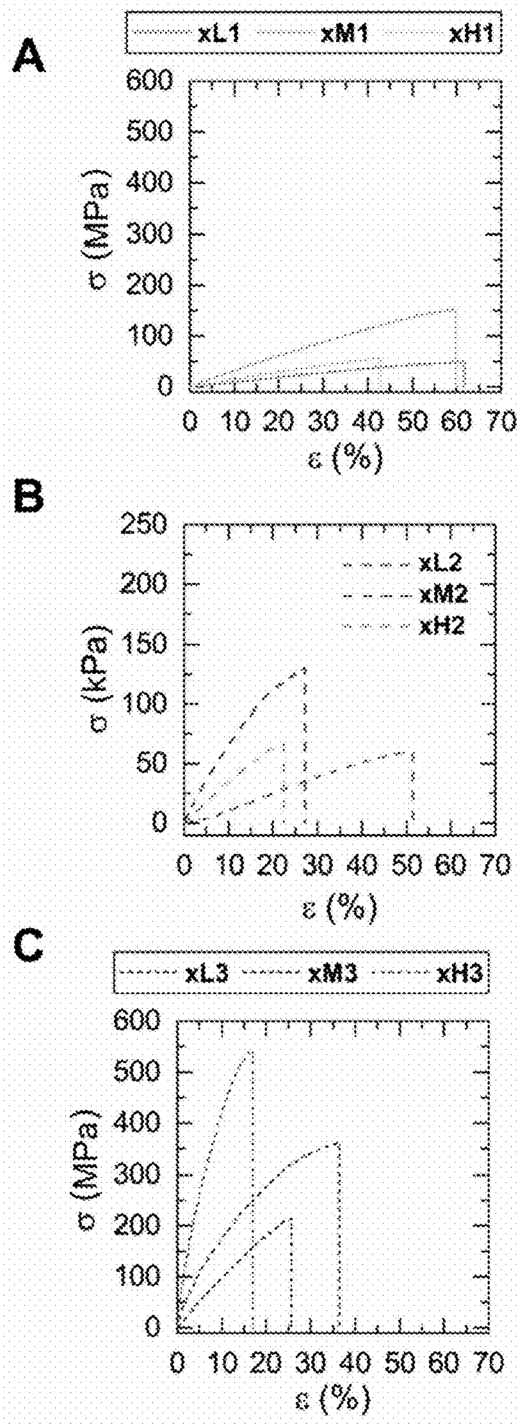
FIG. 12 is a graph that shows a result of a stress-strain curve analysis test for the cross-linkable polymers prepared according to Examples 1 to 9.

A stress-strain curve analysis experiment was performed on the cross-linkable polymers manufactured according to Examples 1 to 9, and experiment results were illustrated in FIG. 12.

Referring to FIG. 12, it could be confirmed that in a molecular weight in the same range, as a content of FMA increases, the cross-linkable polymer became harder and a maximum elongation at which breakage occurred was decreased.

In addition, it could be confirmed that even when a ratio of FMA is kept the same and a molecular weight of FMA is changed, polymer properties were greatly changed.

Accordingly, it was possible to guess that polymer materials having various mechanical properties may be designed by controlling the content and the molecular weight of FMA.

Experimental Example 8: Evaluation of Mechanical Characteristics of Reprocessed Polymer Mechanical characteristics of the cross-linkable polymer manufactured according to Example 1 were evaluated after several reprocessed cycles, and evaluation results were illustrated in FIG. 13.

Specifically, the cross-linkable polymer manufactured according to Example 1 was reprocessed by a hot press working method. This reprocessing was performed 0 times, 5 times, 10 times, and 15 times, and stress-strain curves were evaluated and illustrated in FIG. 13A, and elastic moduli E, tensile strengths $\sigma_{TS}$, and elongations $\varepsilon_{max}$ were evaluated and illustrated in FIG. 13B.

Figure 13:
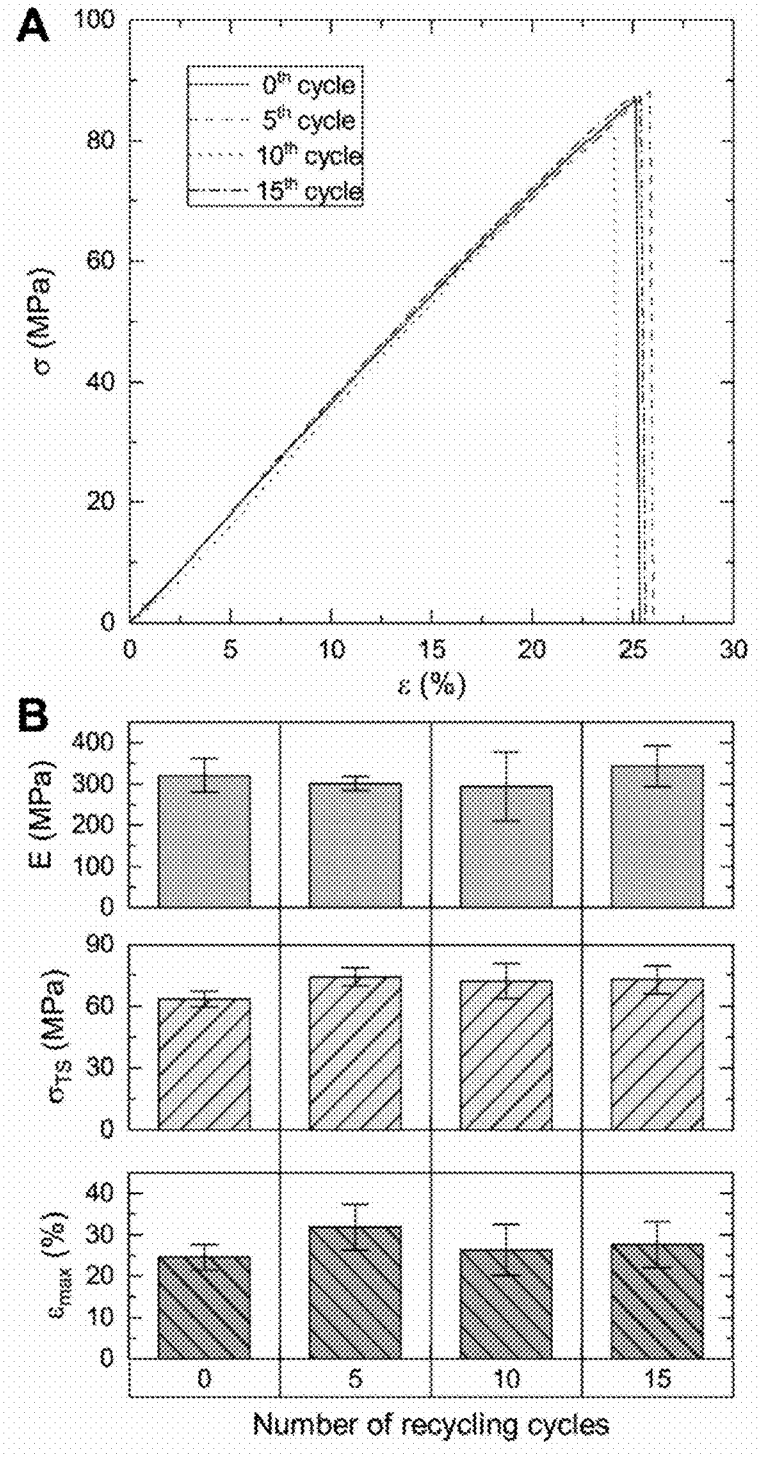
FIG. 13 is a graph of an evaluation result of cycle characteristics of the cross-linkable polymer prepared in Example 1.

Referring to FIG. 13, it could be confirmed that all of the mechanical properties were the same as each other in a 95% reliability range even though a reprocessing process was performed 15 times.

Accordingly, it could be confirmed that the cross-linkable polymer according to the present Example has excellent industrial applicability in that it may be utilized as a coating material for a vehicle, an aircraft, a ship because physical properties are excellently maintained even though a self-healing process is repeated for the cross-linkable polymer.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A polymer composition comprising:

a linear polymer including a stress visualization molecule positioned at a center portion of a chain and including a furan group; and a cross-linking agent that is an amine having two or more maleimide functional groups.

2. The polymer composition of claim 1, wherein:

the linear polymer is formed through an atom transfer radical polymerization (ARTP) reaction between the stress visualization molecule and a monomer containing a furan group.

3. The polymer composition of claim 1, wherein:

the stress visualization molecule is substituted with an alkyl halide.

4. The polymer composition of claim 1, wherein:

the stress visualization molecule is spiropyran, spirothiopyran, spiro rhodamine, naphthopyran, bis(adamantyl) dioxetane, or diarylbibenzofuranone substituted with an alkyl bromide.

5. The polymer composition of claim 1, wherein:

the stress visualization molecule is represented by Chemical Formula 1:

[Chemical Formula 1]

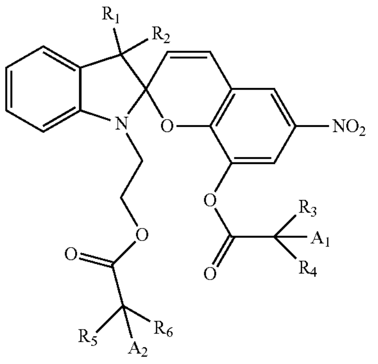

wherein $R_1$ to $R_6$ are each independently hydrogen or a substituted or unsubstituted $C_1$-$C_5$ alkyl group, and $A_1$ and $A_2$ are each independently any one of F, Cl, Br, and I.

6. The polymer composition of claim 1, wherein:

the linear polymer is represented by Chemical Formula 2:

[Chemical Formula 2]

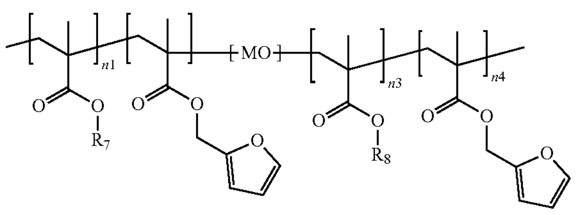

wherein $R_7$ and $R_8$ are each independently a substituted or unsubstituted $C_9$-$C_{15}$ alkyl group, n1 and n3 are each independently an integer of 20 to 160, n2 and n4 are each independently an integer from 1 to 50, and MO is the stress visualization molecule.

7. The polymer composition of claim 1, wherein:

the cross-linking agent is represented by Chemical Formula 3:

[Chemical Formula 3]

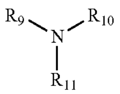

wherein $R_9$ to $R_{11}$ are each independently represented by hydrogen or Chemical Formula 4, where two or more of $R_9$ to $R_{11}$ are represented by Chemical Formula 4:

[Chemical Formula 4]

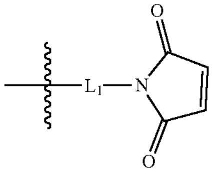

wherein $L_1$ is a direct bond or a substituted or unsubstituted $C_1$-$C_6$ alkylene group.

8. The polymer composition of claim 1, wherein:

a molecular weight of the linear polymer is 13,000 to 80,000 g/mol.

9. The polymer composition of claim 1, wherein:

a ratio between a number of moles of the linear polymer and a number of moles of the cross-linking agent is 5:1 to 1:1 (linear polymer:cross-linking agent).

10. A manufacturing method of a cross-linkable polymer, comprising:

forming a mixture by mixing a linear polymer including a stress visualization molecule positioned at a central portion of a chain and including a furan group, a cross-linking agent that is an amine having two or more maleimide functional groups, and a solvent with each other; and forming the cross-linkable polymer by drying the mixture.

11. The manufacturing method of a cross-linkable polymer of claim 10, wherein:

in the forming of the mixture, the mixing is performed at a temperature of 20 to 30° C. for 15 minutes to 3 hours.

12. The manufacturing method of a cross-linkable polymer of claim 10, wherein:

in the forming of the cross-linkable polymer, the drying is performed at a temperature of 30 to 70° C. for 8 to 16 hours.

13. The manufacturing method of a cross-linkable polymer of claim 10, wherein:

in the forming of the cross-linkable polymer, the drying is performed in a vacuum atmosphere.

14. A crosslinked polymer formed by cross-linking a linear polymer including a stress visualization molecule positioned at a center portion of a chain and including a furan group and a cross-linking agent that is an amine having two or more maleimide functional groups with each other.

15. The crosslinked polymer of claim 14, wherein:

a cross-link is formed by a Diels-Alder reaction between the furan group and the maleimide functional group.

16. The crosslinked polymer of claim 15, wherein:

the cross-link is reversible.

17. The crosslinked polymer of claim 16, wherein:

when the crosslinked polymer is heated to a temperature of 100° C. or higher, the crosslinked polymer is cleaved by a retro Diels-Alder reaction.

18. The crosslinked polymer of claim 14, wherein:

the crosslinked polymer exhibits a purple color when stress of yield stress or more is applied to the crosslinked polymer.

19. The crosslinked polymer of claim 14, wherein:

the crosslinked polymer exhibits a purple color when it is irradiated with ultraviolet rays (UV).

20. The crosslinked polymer of claim 14, wherein:

the crosslinked polymer has peaks appearing at 700±10 $cm^{-1}$, 1700±10 $cm^{-1}$, 1070±10 $cm^{-1}$, and 1774±10 $cm^{-1}$ during Fourier transform infrared spectroscopy (FT-IR) spectrum analysis.

21. The crosslinked polymer of claim 14, wherein:

a glass transition temperature (Tg) of the crosslinked polymer before the cross-link is −45° C. or less.

* * * * *